(12) United States Patent
Davis

(10) Patent No.: US 7,765,804 B2
(45) Date of Patent: Aug. 3, 2010

(54) HYDRAULIC MOTOR USING BUOYANT AND GRAVITATIONAL FORCES TO GENERATE KINETIC ENERGY

(76) Inventor: Stephen E. Davis, 2901 E. Irlo Bronson Memorial Hwy., Suite A, Kissimmee, FL (US) 34744

( * ) Notice: Subject to any disclaimer, the term of this patent is extended or adjusted under 35 U.S.C. 154(b) by 234 days.

(21) Appl. No.: 12/156,614

(22) Filed: Jun. 3, 2008

(65) Prior Publication Data

US 2009/0293471 A1 Dec. 3, 2009

(51) Int. Cl.
*F03B 17/02* (2006.01)
*F16D 31/02* (2006.01)
*F03G 3/00* (2006.01)
*F03G 7/08* (2006.01)
*F02B 63/04* (2006.01)
*H02K 7/18* (2006.01)

(52) U.S. Cl. .............. 60/495; 60/398; 60/721; 185/7; 185/33; 290/1 R

(58) Field of Classification Search ............ 60/398, 60/495, 496, 721
See application file for complete search history.

(56) References Cited

U.S. PATENT DOCUMENTS

| 2,989,839 | A | * | 6/1961 | Croy ........................... 60/716 |
| 4,509,329 | A | * | 4/1985 | Breston ....................... 60/531 |
| 6,237,342 | B1 | * | 5/2001 | Hurford ....................... 60/721 |
| 7,150,670 | B2 | * | 12/2006 | Doran ........................ 446/167 |
| 2007/0234723 | A1 | * | 10/2007 | Elliott ......................... 60/721 |

* cited by examiner

*Primary Examiner*—Thomas E Denion
*Assistant Examiner*—Christopher Jetton

(57) ABSTRACT

A motor mounted on a structural support with a pivot at its center line which comprises a cylindrical vessel for holding a fluid in a closed system and in which a buoyant cylinder containing a lighter fluid is allowed to free float so that a cable attached to either end of the buoyant cylinder may be used to transfer energy to a energy storage unit, a crank or a generator. Two moment arms having a weight attached at the exterior end and inside attachably connected to the surface of two drive pistons that operate in pressure tanks which force a compressed gas against the pistons through pre-sequenced automatic activated valves to extend or retract the moment arms at the end of a cycle. The motor then becomes top heavy and rotates 180 degrees by gravity and relocks in place to repeat the cycle.

20 Claims, 3 Drawing Sheets

SECTION DETAIL A-1
OF HYDRAULIC MOTOR 10
AT THE END OF A CYCLE

SECTION DETAIL B-1
OF HYDRAULIC MOTOR 10
AT MID CYCLE

TOP VIEW OF
HYDRAULIC MOTOR 10

HYDRAULIC MOTOR USING BUOYANT AND GRAVITATIONAL FORCES TO GENERATE KINETIC ENERGY

CROSS REFERENCE TO RELATED APPLICATIONS

Current U.S. Class: 60/496;60/495

Current International Class: F03C001/00,F03C005/02

Field of Search: 60/496,495,497,505,502,503

REFERENCES CITED [REFERENCED BY]

| U.S. Patent Documents | | | |
|---|---|---|---|
| 3,194,008 | July 1965 | Baumgartner | 60/495 |
| 3,961,479 | June 1976 | Anderson | 60/496 |
| 5,996,344 | December 1999 | Frenette, et.Al | 60/496 |
| 4,718,232 | January 1988 | Willmouth | 60/496 |
| 4,683,720 | August 1987 | Deshon | 60/495 |

STATEMENT REGARDING FEDERALLY SPONSORED RESEARCH OR DEVELOPMENT

"Not Applicable"

REFERENCE TO SEQUENCE LISTING, A TABLE, OR A COMPUTER PROGRAM LISTING COMPACT DISC APPENDIX

"Not Applicable"

BACKGROUND OF THE INVENTION

The present invention relates to the field of hydraulic motors and, more particularly, to a hydrodynamic mechanical motor that uses a combination of buoyancy and gravity to create kinetic energy that can be converted into electrical energy.

Motors using fluids as their principal source of energy have typically been thought of as either novelties or as large hydro turbine units associated with flowing bodies of water such as rivers or dams. In the past, buoyancy motors were typically constructed so that air or gas is placed in a chamber that was suspended in a fluid, which was part of an open tank system. These systems were generally problematic and could not be easily scaled to run a generator. With the foregoing in mind, the present invention comprises a motor that advantageously provides a potentially low cost, energy-efficient apparatus and method for generating kinetic energy by using the displacement of water by a buoyant drive cylinder within a fluid filled portable closed chamber balanced on a structural support system, at its center line, and able to rotate 180 degrees between cycles by the extension of a moment arm, powered by compressed gas. The buoyant force of the motor creates energy that is transferred through a pulley or gear system to run a generator. The buoyant force created (Archimedes Law) is equal to the weight of fluid displaced by the drive cylinder within the closed fluid filled reservoir chamber.

On a small scale this invention presents a delightful amusement, which can be used to entertain children or as an executive entertainment. On a much larger scale, it is envisioned that the motor would be operated as a large number of the individual units described herein that would be connected in such manner as to allow the energy created by the cycle of one unit to be added to the energy created by the cycle of next unit so that a generator could be run continuously to generate electricity or to charge a bank of batteries.

BRIEF SUMMARY OF THE INVENTION

It is an object of the present invention to provide a hydraulic motor able to capture the potential energy of a free floating buoyant drive cylinder. The buoyant drive cylinder is contained in a portable closed vertical reservoir chamber, balanced on a structural support system and held in place by a low voltage operated keeper pin at its center line and able to rotate 180 degrees when said keeper pin is retracted. The reservoir chamber is filled with a fluid heavier than the buoyant drive cylinder, thus providing lift to the lighter buoyant drive cylinder, according to Archimedes Law. The said buoyant drive cylinder will have a cable or other tension member attached to its top end and bottom end. The cable or tension member will enter and exit the reservoir chamber as the drive cylinder floats to the top of the reservoir chamber through flexible seals at each end of the reservoir chamber.

The hydraulic motor creates energy that is transferred through a pulley or gear system in order to drive a generator. When the buoyant drive cylinder reaches the top of the reservoir chamber, one cycle of the hydraulic motor is completed. At this point, the hydraulic motor is designed to overturn by gravity 180 degrees upon the retraction of a low voltage electric keeper pin, which holds the hydraulic motor in place. The hydraulic motor is caused to become top heavy by the extension of a moment arm with a weight at one end of the moment arm on the exterior of the hydraulic motor and a piston at the other end of the moment arm enclosed in a pressure tank located at the top of the hydraulic motor. At the bottom of the hydraulic motor is a second moment arm with a weight at one end of the moment arm on the exterior of the hydraulic motor and a piston at the other end of the moment arm enclosed in a second pressure tank, which is retracted into said second pressure tank. The moment arms are attached to, and activated by, a piston housed inside said pressure tanks located on the top and bottom of the hydraulic motor. Pressure is introduced into the pressure tanks, in order to drive the pistons, by way of low-voltage pneumatic inlet valves, attached to a primary pressure tank by pressure hoses or pipes. The primary pressure tank is kept constantly pressurized by an electric pneumatic pressure pump, switched on and off as a predetermined minimum or maximum pressure is reached.

As the motor is rotated 180 degrees, it is relocked into place by the low voltage keeper pin which simultaneously reverses the sequence of the low voltage pneumatic pressure valves, and exhaust valves. At this point, the motor is starting a new cycle with the buoyant drive cylinder now located on the bottom, again rising to the top of the reservoir chamber, driving the generator, and producing electrical energy.

BRIEF DESCRIPTION OF THE DRAWINGS

Some of the features, advantages, and benefits of the present invention having been stated, others will become apparent as the description proceeds when taken in conjunction with the accompanying drawings, presented solely for exemplary purposes and not with intent to limit the invention thereto, and in which.

DETAILED DESCRIPTION OF THE INVENTION

The present invention will now be described more fully hereinafter, in which the description of the preferred embodiments of the invention are discussed. Unless otherwise defined, technical and scientific terms used herein have the same meaning as commonly understood by one of ordinary skill in the art to which this invention pertains. Although methods and materials similar or equivalent to those described herein can be used in the practice of testing of the present invention, suitable methods and materials are described below. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description.

Figure 1:
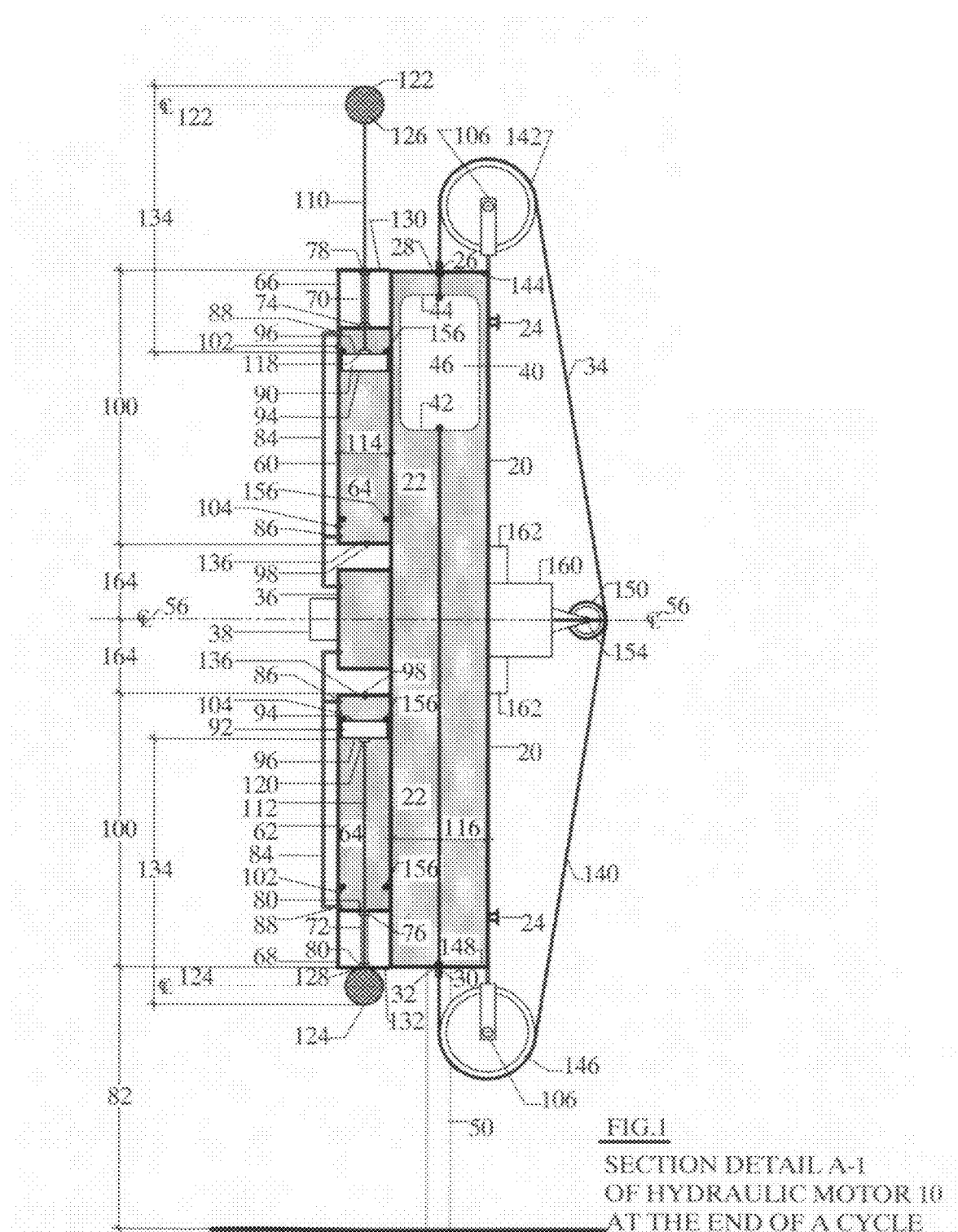
FIG. 1 is a vertical cross-section view of a hydraulic motor showing a moment arm system and pulley system at the end of a cycle according to an embodiment of the present invention.
Figure 2:
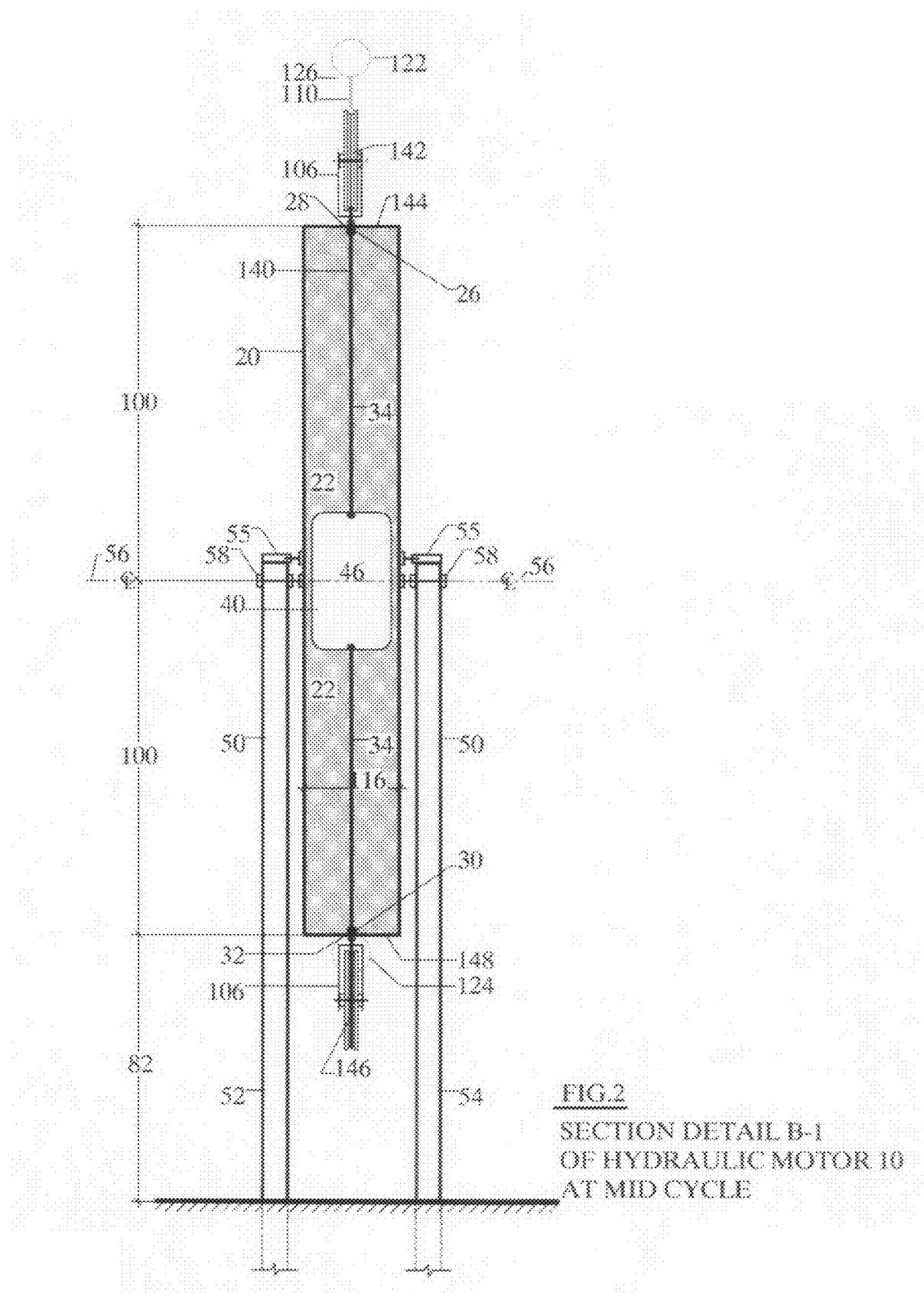
FIG. 2 is a frontal vertical cross-section view of a hydraulic motor showing how the apparatus would be found between cycles according to an embodiment of the present invention.

This invention relates to a hydraulic motor 10, as shown in FIGS. 1 and 2. The motor 10 is comprised of a long primary vessel 20 balanced on a support structure 50 and having a free floating buoyant drive cylinder 40 contained therein. The buoyant drive cylinder 40 is attached to a pulley system 140 which is available to capture the force acting upon the buoyant drive cylinder 40 and to transfer it to a generator 160 by way of a continuous tension member 34.

FIG. 1 is a vertical cross-section view of the motor 10 that illustrates the placement of the moment arms, and shows how the apparatus would be found at the end of the operating cycle before rotation. As used in this specification, an operating cycle is the time needed for the motor to be released from its starting position, to rotate to a position 180 degrees from the starting point and relocking in its vertical position and to have all its internal components recover, causing the drive cylinder 40 to be relocated to the bottom of motor 10 and begin rising due to the buoyant force, again repeating the cycle. In FIG. 1, the motor comprises a primary vessel 20 that is narrow in its cross sectional diameter 116 relative to its length. The primary vessel 20 may have any cross sectional geometry, but cylindrical geometry is preferable to minimize energy loss due to turbulent forces created by the flow of a primary fluid 22 contained in the primary vessel 20 during operation. The primary vessel 20 will have at least two inlet nozzles 24, shown in FIG. 1, for the introduction of the fluid 22 into the primary vessel 20. At the present time, water is considered to be the preferred fluid for this application; however for outdoor use, where such use is temperature and climate dependent, other fluids or additives such as antifreeze or other low freezing point fluids, are contemplated. Similarly, the materials of construction of the tank 20 and its inlet nozzles 24 will need to be made of materials that are compatible with fluid 22 chosen in order to minimize corrosion, stress corrosion cracking, embrittlement, or other material interactions. The primary vessel 20 will have a first flexible seal 26 at a first end 144 and flexible seal 30 at a second end 148. These seals 26, should be designed to allow a cable, a rope, a chain or other suitable transfer device 34 to pass through the exterior walls of the primary vessel 20 with minimal or no leakage of the fluid 22. A grease fitting, 28, located at the first end 144 and a grease fitting 32 located at the second end 148, lubricate the cable and helps seal the primary vessel 20 from leakage of the fluid 22. The first end 144 and the second end 148 should be designed to be removable for future maintenance. A threaded fitting is contemplated for this application, but other similar devices could be used. Inside the primary vessel 20 is a buoyant drive cylinder 40 having a bottom surface 42 and a top surface 44. The buoyant drive cylinder 40 is designed to free float within the primary vessel 20 without creating friction. The buoyant drive cylinder 40 is preferably a cylinder, but can have a geometric cross section suitable for the application. The material anticipated for the buoyant drive cylinder 40 is a light weight plastic or metal such as aluminum, but, in some applications, an air bag, or other suitable gas bag, may be the preferable as a buoyant drive cylinder 40. In a preferred embodiment, aluminum is considered as the preferred material for drive cylinder 40. The buoyant drive cylinder 40 contains a buoyant cylinder fluid 46 that is different from the fluid 22 introduced into the primary vessel 20. The fluid 46 must be less dense than the fluid 22 held in the primary vessel 20, so that the buoyant drive cylinder 40 is free to move in response to the force exerted on it by the fluid 22, according to Archimedes Law. In a preferred embodiment, air is considered to be the preferred fluid 46; however, any other theoretically suitable fluid or solid such as Styrofoam, or Urethane that is less dense than the fluid 22 may be used.

The motor 10 is held in place by a support structure 50 comprising at least two support legs 52, 54 and a low voltage locking device 55, shown in FIG. 2, which holds the primary vessel 20 and pressure tanks 60, 62, shown in FIG. 1, in a vertical position above a system centerline 56. The primary vessel 20 supports pressure tanks 60, 62 and their contents are held in place by a pivot 58 at the system centerline 56 that includes at least one bearing and a shaft on each side of the motor that allows the motor 10 to rotate freely about the pivot 58 once the locking system 55 is retracted. The support structure 50 is situated a distance above grade 82, which permits the motor 10 with either moment arm fully extended 110,112 to clear the ground, or surface.

Adjacently connected to the primary vessel 20 above the centerline 56 is a first pressure tank 60, as shown in FIG. 1. A second pressure tank 62 is oriented at 180 degrees relative to the first pressure tank 60 below the centerline 56, each with a diameter 114 to house pistons 90, 92 and moment arms 110 and 112.

Located at the centerline 56 between pressure tanks 60, 62 is the primary pressure tank 36 attached to the primary vessel 20. Mounted at the center line 56 of the primary pressure tank 36 is a pneumatic pressure pump 38 powered by the onboard generator 160 also attached to the primary vessel 20 at the centerline 56. The power for the pneumatic pressure pump 38 could also be powered by solar, conventional power or rechargeable batteries as well as the generator 160. For this application the onboard generator 160 is used. The pneumatic pressure pump 38 will pressurize fluid 64, thus pressurizing the primary pressure tank 36 to a specified maximum pressure. When a maximum design pressure is reached in the primary pressure tank 36, a pressure switch on the pneumatic pressure pump 38 (not shown) will switch the power off as required to the pneumatic pressure pump 38, or switch the pneumatic pressure pump on when the pressure drops below a minimum design pressure. The pressurized fluid 64 will be released from the primary pressure tank 36 into the pressure tanks 60, 62 through the pressure hoses or pipes 84 connecting the primary pressure tank 36 and the pressure tanks 60, 62. Where the pressure hoses or pipes 84 attach to the pressure tanks 60, 62, there will be low voltage pneumatic pressure valves 86, 88 at each of two inlet locations on said pressure tanks 60, 62 which will be pre-set to electronically switch either on or off to let the pressurized fluid 64 from the primary pressure tank 36 to either enter or stop from entering pressure tanks 60, 62. Pressurizing tanks 60, 62, with fluid 64 will force pistons 90, 92 against their respective piston stops 156 raising the moment arm 110 and its weight 122 on the first end of pressure tank 60 and retracting the moment arm 112 and its weight 124 at the second end of pressure tank 62.

Located at the first end of a first pressure tank 60 shall be a first pneumatic drive piston 90 with a top surface 96 and a bottom surface 94 between two piston stops 156. Located at the second end in a second pressure tank 62 shall be a second pneumatic drive piston 92 with a top surface 96 and a bottom surface 94 between two piston stops 156, oriented to 180 degrees relative to said first pneumatic drive piston 90 in said first pressure tank 60. The two pistons 90, 92 are preferable cylinders, but can have any geometric cross section suitable for the application. The pistons 90, 92 will be of a material able to withstand pneumatic pressures required to drive the moment arms 110, 112 with its attached weights 122, 124. Metal is the desired material for the pistons, but any other suitable material may be used. The pistons should be fitted with one or more flexible airtight compression rings (not shown) to keep fluid 64 pressure from leaking around the piston 90, 92 within the pressure tanks 60, 62. The material for the flexible airtight rings (not shown), should be the same as the pistons 90, 92 or other material suitable for the application. The inside surface of pressure tank 60, 62 should be of such material to withstand the wear caused by the piston rings periodic movement as the pistons 90,92 are forced against the piston stops 156. The pressure tank fluid 64 may be any gas able to be compressed in order to drive the pistons 90, 92. Air is considered to be the preferred fluid 64 for this application, taken directly from the exterior, to be introduced into the pneumatic pressure pump 38 in order to pressurize the primary pressure tank 36. The piston stops 156 are attached to both ends of pressure tanks 60, 62 to allow a space for the pneumatic low voltage inlet valves 86, 88 and the low voltage exhaust valves 102, 104. All the valves will be sequenced to open or close, as further described herein; upon reactivation of the locking device 55 at the beginning of a cycle. The low voltage pneumatic inlet valves 86, 88 are located between the inside surface of each guide shaft housing, 66,68 and the piston stop 156 and surface 136 of pressure tank 60, 62 and the piston stops 156.

On pressure tanks 60, 62 there are located low voltage electric exhaust valves 102,104 to exhaust or contain fluids 64, located at the same location as said low voltage pneumatic inlet valves 86, 88. The low voltage exhaust valves 86, 88 will be sequenced to open or close at a pre-designed designated time, allowing fluid 64 to be able to pressurize or allow fluid 64 to be evacuated from said pressure tanks 60, 62.

The electronic valves will be sequenced as follows:

When the hydraulic motor 10 is at the end of a cycle shown on FIG. 1, then the low voltage pneumatic electric inlet valve 86 located on pressure tank 60 between surface 136 and the piston stop 156 will be open, and the low voltage electric exhaust valve 104 will be closed at the same location. The low voltage electric pressure valve 88 located on pressure tank 60 between the inside surface of the guide shaft housing 66 and the piston stops 156 will be closed and the low voltage electric exhaust valve 102 at the same location will be open to release the pressurized fluid 64 upon piston 90 being forced against piston stop 156. On pressure tank 62 the opposite valve sequence will be required for the low voltage pneumatic pressure valves 86, 88 and exhaust valves 102, 104. The low voltage pneumatic pressure valves 86, 88 and the low voltage exhaust valves 102, 104 and locking device 55 will be powered by rechargeable batteries, 162 located next to the generator 160 and charged by generator 160 equal distance above and below center line 56. When the low voltage activated locking mechanism 55 is released and the hydraulic motor 10 rotates 180 degrees and the locking mechanism 55 relocks motor 10 in place, in its vertical position, this starts a new cycle of motor 10. At this time, all the valve sequences noted above at the new startup position will be made to electronically switch opposite to what they were before the 180 degree rotation of motor 10, in sequence, upon the reactivation of the low voltage locking mechanism 55. At this time, pressure tank 62 and surface 132 will be on the top of the motor 10 with moment arm 112 and weight 124 rising in position, again preparing to rotate motor 10, and pressure tank 60 and surface 130 will be on the bottom of motor 10 with moment arm 110 and weight 122 retracting into pressure tank 60.

This valve sequence will again be reversed only after the end of each cycle, and the low voltage locking mechanism 55 is reactivated upon the next 180 degree rotation. One cycle is when drive cylinder 40, now on the bottom of motor 10, again reaches the top of the primary vessel 20, which will start the sequence of events over again as noted above.

Located at the first end 130 of pressure tank 60 is a first guide shaft housing 66, and a second guide shaft housing 68 is similarly located at a first end 132 of pressure tank 62. Each guide shaft housing 66, 68 has its own respective guide shaft 70, 72 passing there through. At the outside ends 130, 132 of the guide shafts farthest from the centerline 56, are located pneumatic airtight seals 78, 80. Opposite to the outside seals 78, 80 are additional pneumatic airtight seals, 74, 76 on the inside surface of guide shaft housing 66, 68. Each pneumatic airtight seal 74,76, and 78, 80 are designed to allow a moment arm 110,112 to enter and exit its respective pressure tank 60,62 through its respective guide shaft 70, 72 without gas 64 leakage. Grease nipples (not shown) for introduction of a lubricant installed at 78, 80 at its respective outside end 130, 132, will lubricate the moment arms 110,112.

An airtight oil or lubricant port with drain plug 98 to introduce a lubricant will also be added to further support the reduction of friction between the pressure tanks 60, 62 and the pneumatic pistons 90, 92 as necessary. The ports with drain plug 98 will be located on the exterior surface 36 of the pressure tanks 60, 62.

The overall length 100 of the pressure tanks 60, 62 should be at least sufficient to house both its pistons 90,92, inlet valves 86, 88, exhaust valves 102, 104, piston stops 156 and its respective guide shaft housing 66, 68 so that the moment arm 110, 112 can be fully retracted into its respective guide shaft housing 66, 68. Each pressure tank 60, 62 shall be located at distance 164 above or below center line 56 of motor 10.

The moment arms are attached at a top surface 118, 120 of each piston 90, 92 at the first end 96 of moment arm 110, 112 and a weight 122,124 is attached at a second end 126, 128 of each moment arm 110,112. Each moment arm's weight 122, 124 rests on an exterior top surface 130, 132 of its respective pressure tank 60, 62, when the moment arm 110, 112 is fully retracted into the guide shaft housing 66, 68. Each moment arms 110, 112 is of a length 134 that is proportional to the overall dimensions of the motor 10, so that when a first moment arm 110 is fully extended, due to the pneumatic force of fluid 64 acting on the piston 90, the center of gravity is shifted upward from the centerline 56 a sufficient distance to cause the motor 10 to become top heavy due to the increased moment of inertia so that gravity overturns the motor 10. At the same time, the second piston 92 attached to the second moment arm 112 is forced against a interior piston stop 156 of its pressure tank 62 by the pneumatic force of fluid 64 acting on its piston 92, thus causing its moment arm 112 to retract into the pressure tank 62.

The skilled will recognize that once the motor moves past the center of gravity, the force of gravity acting on it causing the fluid 22 within the primary vessel 20 to flow in a non-uniform manner. In order to prevent this flow from becoming turbulent, a braking mechanism is needed in order to maintain a relatively uniform velocity during the 180 degree rotation of motor 10 which will occur only at the end of one cycle, when the low voltage locking mechanism is released. In the preferred embodiment, slowing the speed of rotation will be provided by balancing the over turning moment in relation to the weight of motor 10 by not being excessively top heavy, thus slowing the rotation of motor 10. A hydraulic mechanism may also be considered to slow the rotation of motor 10 (not shown).

Figure 3:
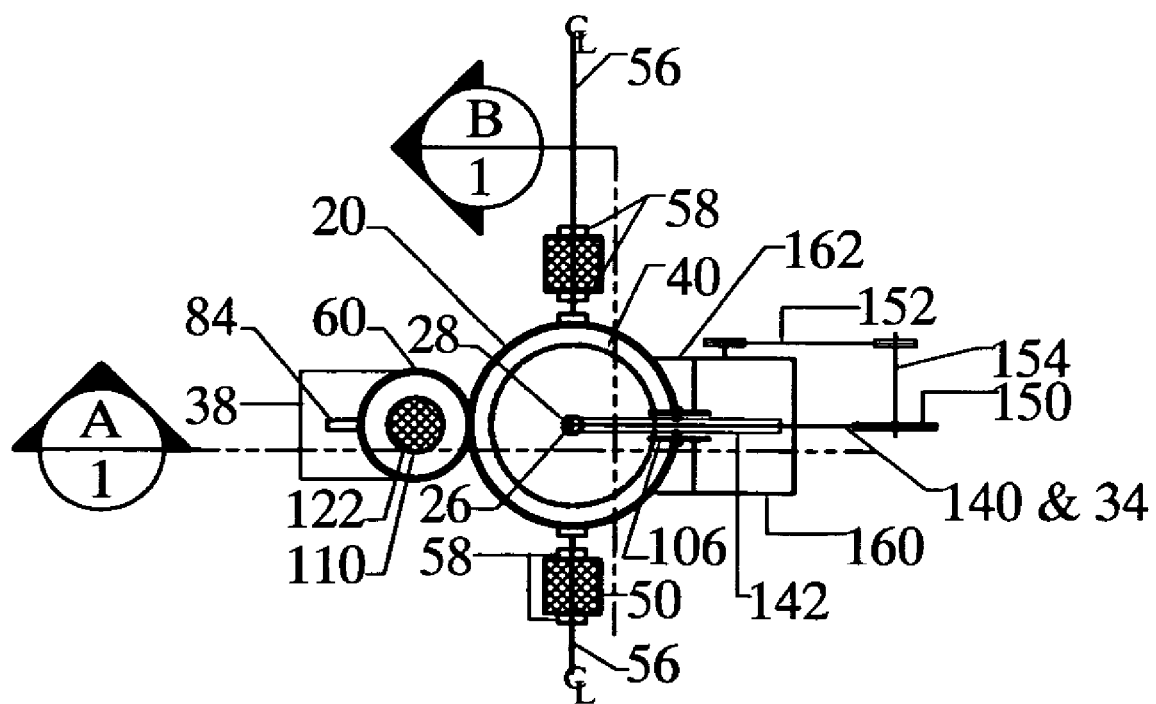
FIG. 3 is a top view of a hydraulic motor.

The pulley or gear system 140 comprises a first pulley 142 mounted to an exterior support 106 of a first end 144 of the primary vessel 20, a second pulley 146 mounted to an exterior support 106 of a second end 148 of the primary vessel 20 and a third pulley 150 mounted to a generator 160 turning a shaft 154 attached to a gear system 152, shown on FIG. 3, to crank the generator 160.

The pulley or gear system 140 will provide a means for harnessing the energy created by the movement and force of the buoyant drive cylinder 40, (Archimedes Law) and for transferring the energy generated to a generator 160, where it can be converted into a more useful form of energy, such as electric or mechanical energy. The amount of energy produced will be determined by the length and the diameter 116 of the primary vessel 20 and the size of the buoyant drive cylinder 40.

The piston 90 in a first pressure tank 60, located above the centerline 56, is forced to the first end of the pressure tank 60 against the piston stop 156 by the compressed pneumatic force of the fluid 64. The pneumatic pressure is introduced into pressure tank 60 through the pressure pipes 84 attached to the primary pressure tank 36 thru low voltage pneumatic valves 86, 88 which are open or closed in reverse order upon reactivation of the low voltage locking device 55 at the end of each cycle, and beginning of a new cycle. The primary pressure tank 36 is kept charged with the high pressure fluid 64 by way of a pneumatic pressure pump 38 operated by the onboard generator, only between cycles as buoyant drive cylinder 40 is floating toward the top of motor 10. The pneumatic pressure pump 38 will engage only when the pressurized fluid 64 is below a minimum specified pre-design pressure in the primary pressure tank 36 and will continue to operate until the maximum design pressure is reached in the primary pressure tank 36 for fluid 64. The on and off control of the pneumatic pressure pump 38 will be by an automatic pressure switch controlled by a pressure gauge (not shown) within the pneumatic pressure pump 38. It is envisioned that the primary pressure tank 36 will operate between 100 and 140 psi when the compressed fluid 64 is released into the pressure tanks 60, 62. The pressure in the primary pressure tank 36 could be designed to operate at much larger pressures as a design may dictate for future applications and larger weights 122, 124 to be lifted by said moment arm. Please note that the pressure released into the pressure tanks 60, 62 will multiply the lifting force on the pistons 90, 92 by the area of the pistons. Pressure times the area will equal the lift force of the pistons 90, 92 and transfer the force into the moment arms 110, 112. Let it be known that a hydraulic pump and hydraulic ram could be used in place of the pneumatic air pumps to lift the pistons 90, 92, this could be an option for future designs in order to drive the moment arms 110, 112 and lifting weights 122, 124.

Prior to operation, the motor 10 is held in place vertically by a pair of electronic or magnetic locks 55, which hold the primary vessel 20, the pressure tanks 60, 62 and the primary pressure tank 36 in place. At equilibrium, the motor 10 would be balanced about its center of gravity, which is also the system centerline 56, as shown in FIG. 2. However, because of the design of the system, equilibrium is not a static condition due to the extension of the moment arm 110 and its weight 122 above the centerline 56.

The motor 10 is designed to operate using the buoyant force of the fluid 22 contained in the primary vessel 20, Archimedes Law, to raise a buoyant cylinder 40, which is filled with a lighter, less dense fluid 46, so that the buoyant cylinder 40 floats in more dense fluid 22 toward the top of the primary vessel 20 driving the gear system 140 to run the generator 160. When a first piston 90 is acted upon by the compressed pneumatic force of the fluid 64, a first moment arm 110 exits from its pressure tank 60 through its pneumatic seals 78 to extend its weight 122 out beyond the primary vessel, 20 by a distance approximately equal to the length of the moment arm 110. At approximately the same time, the counterpart weight 124 associated with the second pressure tank 62 is forced toward its pressure tank 62 as the second piston 92 is forced against the piston stop 156 below the top 136 of the second pressure tank 62. This change due to the compressed pneumatic force acting on the pistons 90, 92 shifts, the center of gravity and moment of inertia upward, and the motor 10 becomes top heavy. Momentum is created about the centerline 56 causing the top heavy motor 10 to tip toward a new center of gravity defined by the combination of the motor 10 and the moment arm weight 122, however, when the locking devise 55 is retracted, the motor 10 tips, gravity causes it to accelerate and fall passed the new center of gravity so that the first end 144 of the primary vessel 20 accelerates in an arc about the pivot 58 and toward the ground. Completion of this movement of the motor 10 through a 180 degree arc comprises one cycle. The motor 10 is then re-locked into place by the low voltage locking mechanism 55, and allowed to return equilibrium, a process that will vary in length of time based upon the weight and dimensions of motor 10, starting a new cycle. Upon relocking of motor 10, by the low voltage electric locking device 55, simultaneously the sequence of the opening and closing of the valves 86, 88 and operation of the pistons 90, 92 and the sequence of the low voltage exhaust valves 102, 104 are reversed electronically, as previously discussed.

Once buoyant drive cylinder 40 again reaches the top 32 of the primary vessel 20 depending on the length of drive cylinder 20, and the moment arm 112 is fully extended, the locking mechanism 55 is again released letting the motor 10 repeat the cycle. It is envisioned that as a system is scaled up as a potential energy source for electricity, the cycle times will increase so that a number of single motor units could be grouped together to take advantage of different cycle stages in order to continuously run a generator 160 or charge a bank of batteries. Also, the longer the primary tank 20, the more energy the system will produce in one cycle before rotation of the motor 10 is commenced.

In the specification there have been disclosed typical preferred embodiments of the invention, and although specific terms are employed, the terms are used in a descriptive sense only and not for purposes of limitation. The invention has been described in some detail, but it will be apparent that various modifications and changes can be made within the spirit and scope of the invention as described in the foregoing specification.

I claim:

1. A hydraulic buoyant motor mounted on a structural support system with a pivot at its center line which comprises a primary cylindrical vessel for holding a fluid in a closed system and in which a buoyant cylinder containing a lighter fluid is allowed to free float so that attached to either end of the buoyant cylinder may be used to transfer energy, through a pulley system, to operate an electric generator, attached to said primary vessel, with two pneumatic operated moment arms housed in separate pneumatic pressure tanks having a weight attached at the exterior end and inside attachably connected to the surface of two separate drive pistons that operate in the pressure tanks which are pressurized by a primary pressure storage tank attachably connected to a pneumatic electric operated pressure pump, which force a compressed gas against the pistons through pressure hoses into pre-sequenced automatic activated pressure valves to extend or retract the moment arms at the end of a cycle, which cause the motor to become top heavy, releasing a keeper pin causing the motor to rotate 180 degrees by gravity and then again reactivating the keeper pin, locking the motor in place in order to repeat the cycle.

2. A hydraulic motor of claim 1, wherein a low voltage electrical or magnetic operated keeper pin is used for holding said motor in place before and after rotation of said motor.

3. A hydraulic motor of claim 1, wherein a primary vessel for holding a fluid, said vessel having at a first end and a second end, said first end having a first flexible seal and said second end having a second flexible seal.

4. A hydraulic motor of claim 3, wherein a cable, said cable having a first end capable of exiting through said primary vessel via the first flexible seal, said cable having a second end entering said primary vessel via the second flexible seal.

5. A hydraulic motor of claim 3, wherein a buoyant cylinder filled with a buoyant solid or gas having a bottom surface and a top surface, said buoyant cylinder top surface attachably connected to the first end of said cable and said buoyant cylinder bottom surface attachably connected to the second end of said cable.

6. A hydraulic motor of claim 1, wherein a first pressure tank, having a bottom and a top end, said first pressure tank adjacently connected to said primary vessel along its length above its centerline.

7. A hydraulic motor of claim 6, wherein a second pressure tank, having a bottom and a top end, said second pressure tank adjacently connected to said primary vessel along its length below its centerline, said second pressure tank oriented at 180 degrees relative to said first pressure tank.

8. A hydraulic motor of claim 7, wherein a first pneumatic drive piston, having a bottom and a top end, said first pneumatic drive piston contained in said first pressure tank.

9. A hydraulic motor of claim 8, wherein a second pneumatic drive piston, having a bottom and a top end, said second pneumatic drive piston contained in said second pressure tank, said second pneumatic drive piston oriented at 180 degrees relative to said first pneumatic drive piston.

10. A hydraulic motor of claim 9, wherein a first moment arm, having a support rod at a first end and a weight at a second end, said first moment arm attachably connected to a top surface of said first pneumatic drive piston at a first end of said first moment arm.

11. A hydraulic motor of claim 10, wherein a second moment arm, having a support rod at a first end and a weight at a second end, said second moment arm attachable connected to a bottom surface of said pneumatic drive piston at a first end of said second moment arm, said second moment arm oriented at 180 degrees relative to first moment arm.

12. A hydraulic motor of claim 6, wherein a series of electrical operated low voltage intake and exhaust valves located on the exterior surface of a first pressure tank located between the piston stops and a top surface at the first end and the piston stops and a bottom surface at the second end of the first pressure tank.

13. A hydraulic motor of claim 12, wherein a series of electrical operated low voltage intake and exhaust valves located on the exterior surface of a second pressure tank located between the piston stops and a top surface at the first end and the piston stops and a bottom surface at the second end of the second pressure tank oriented 180 degrees relative to said first pressure tank.

14. A hydraulic motor of claim 13, wherein a piston stop located at a first end and a second end of a first pressure tank.

15. A hydraulic motor of claim 14, wherein a piston stop located at a first end and a second end of a second pressure tank oriented 180 degrees relative to said first pressure tank.

16. A hydraulic motor of claim 10, wherein a moment arm guide shaft housing, with grease nipples, located at a first end of the first pressure tank.

17. A hydraulic motor of claim 11, wherein a moment arm guide shaft housing, with grease nipples located at a first end of the second, pressure tank oriented 180 degrees relative to said first pressure tank.

18. A hydraulic motor of claim 3, wherein a primary pressure tank connected to said primary vessel at the center line of the primary vessel with a pneumatic electrical operated pressure pump mounted to said primary pressure tank located at the center line of the primary vessel.

19. A hydraulic motor of claim 3, wherein a plurality of pulleys, having at least a first pulley located at the first end of said primary vessel, a second pulley located at said generator, and a third pulley located at the second end of the primary vessel, said plurality of pulleys operatively connected by said cable, in order to transfer energy to said generator.

20. A hydraulic motor of claim 18, wherein a pneumatic electrical operated pressure pump mounted to said primary pressure tank located at the center line of the primary vessel, able to pressurize said primary pressure tank, able to switch off and on at pre-determined settings, in order to drive the moment arms when called for at the end of a cycle.

* * * * *